No. 844,906. PATENTED FEB. 19, 1907.
R. L. ADAMS.
COVER FOR GLASSES.
APPLICATION FILED APR. 13, 1906.
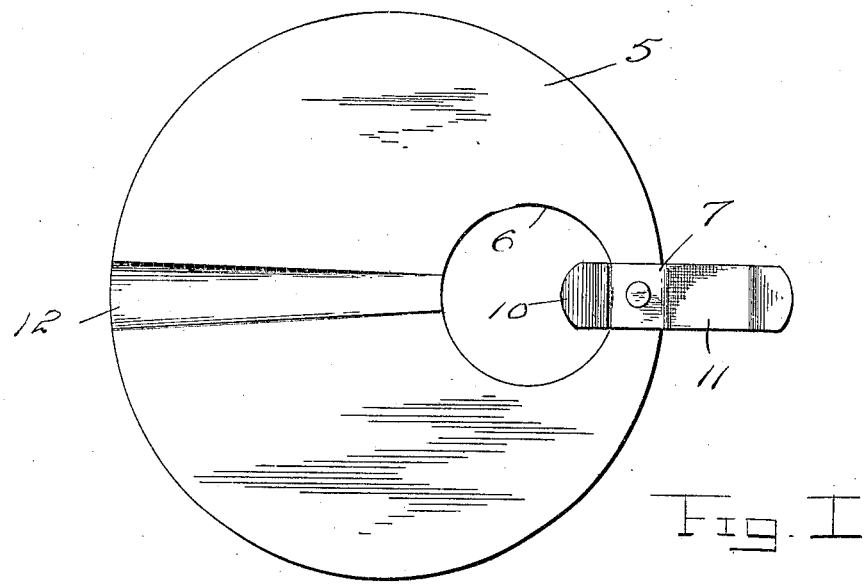
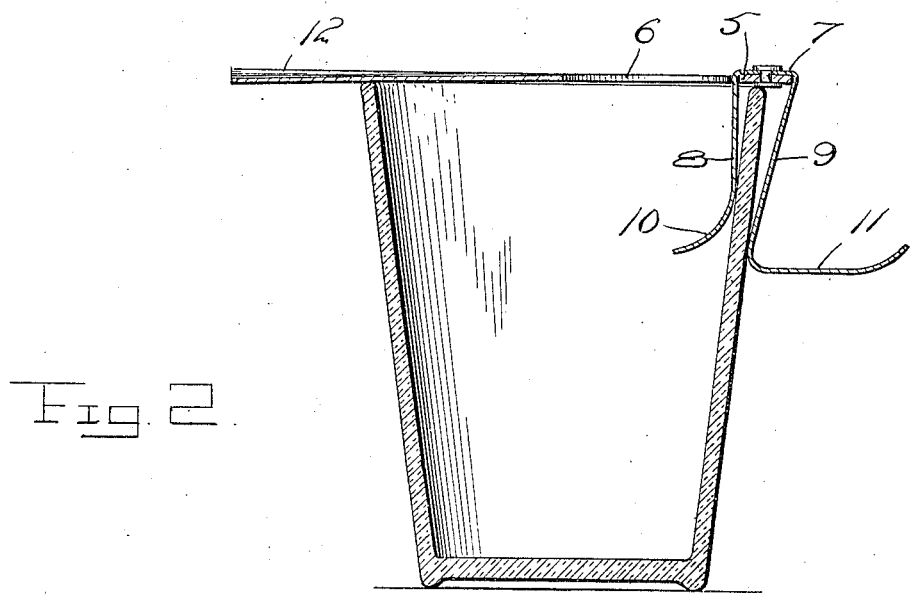
Witnesses
Inventor
Robert L. Adams
By
Attorneys

UNITED STATES PATENT OFFICE.

ROBERT L. ADAMS, OF NEW ORLEANS, LOUISIANA.

COVER FOR GLASSES.

No. 844,906.  Specification of Letters Patent.  Patented Feb. 19, 1907.

Application filed April 13, 1906. Serial No. 311,572.

*To all whom it may concern:*

Be it known that I, ROBERT L. ADAMS, a citizen of the United States, residing at New Orleans, in the parish of Orleans, State of Louisiana, have invented certain new and useful Improvements in Covers for Glasses; and I do hereby declare the following to be a full, clear, and exact description of the invention, such as will enable others skilled in the art to which it appertains to make and use the same.

This invention relates to attachments for glasses, and is designed particularly for use in dispensing fermented beverages—such as beer, ale, and porter—the object of the invention being to separate surplus foam from the body of the liquid.

A further object of the invention is to provide a simple device of this nature which may be formed of any desired sheet material and readily attached to and detached from a glass of any ordinary size.

In the accompanying drawings, Figure 1 is a top plan view of the device, and Fig. 2 is a detail vertical sectional view through the same applied to the glass.

Referring more specifically to the drawings, 5 denotes a disk of sheet material, which is provided adjacent one side with a circular opening 6, which is of less diameter than the mouth of the glass to which the device is applied. Riveted or otherwise secured intermediate its ends to that portion of the disk 5 which is of the least width between the opening 6 and the periphery of the disk is a clip 7, formed, preferably, of a strip of spring sheet metal. The portions of the strip beyond the attaching portion above referred to are bent downwardly therefrom in converging planes to form clip-fingers, which are designed to lie, respectively, against the inside and outside of the glass, as shown in Fig. 2. The clip-finger 8 has its extreme lower end bent away from the clip-finger 9, as at 10, to permit ready attachment of the device to the glass, and the said clip-finger 9 has its lower end portion curved away from the clip-finger 8 to form a finger-piece 11, by means of which the disk may be moved to and from the mouth of the glass to regulate the flow of liquid from the same. In order to hold the disk in slightly-spaced relation to the edge of the glass, a channel 12 is "stamped up" in the disk and extends from the side of the opening opposite that at which the clip 7 is secured to the periphery of the disk and permits liquid to flow through the space between the channel and the adjacent portion of the edge of the glass when the glass is tilted.

From the foregoing it will be seen that the beverage, having been drawn in the glass to which the device is attached, may be poured therefrom to another glass by way of the space between the channel 12 and the adjacent portion of the edge of the glass and that the disk will prevent foam from being delivered from the first-named glass to the second. Should a little foam be desired, however, the first glass may be tilted to such an extent that a small quantity of foam will be delivered through the opening 6.

What is claimed is—

1. The combination with a glass of an apertured disk arranged for detachable connection with the glass, and a channel formed in the disk, from the aperture to the periphery of the disk.

2. The combination with a glass of an apertured disk arranged for detachable connection with the glass, and a tapered channel formed in the disk, from the aperture to the periphery of the disk.

In testimony whereof I affix my signature in presence of two witnesses.

ROBERT L. ADAMS.

Witnesses:
 LAMAR C. QUINTERO,
 HAL DONAHUE.